United States Patent [19]

Bauer et al.

[11] Patent Number: 4,576,626

[45] Date of Patent: Mar. 18, 1986

[54] FOLIAGE FERTILIZERS

[75] Inventors: Kurt H. Bauer, Freiburg; Miklos Ghyczy; Eugen Etschenberg, both of Cologne; Heinrich Osthoff, Huerth, all of Fed. Rep. of Germany

[73] Assignee: A. Nattermann & Cie GmbH, Cologne, Fed. Rep. of Germany

[21] Appl. No.: 722,985

[22] Filed: Apr. 15, 1985

Related U.S. Application Data

[63] Continuation of Ser. No. 490,968, May 2, 1983, abandoned.

[30] Foreign Application Priority Data

May 13, 1982 [DE] Fed. Rep. of Germany ....... 3218028

[51] Int. Cl.$^4$ ................................................. C05C 9/00
[52] U.S. Cl. ........................................... 71/28; 71/27; 71/64.08; 71/64.13; 71/DIG. 2

[58] Field of Search ..................... 71/1, 11, 27, 28, 32, 71/33, 34, 63, 64.10, 64.08, 64.13, DIG. 2; 424/19, 38; 47/DIG. 4

[56] References Cited

U.S. PATENT DOCUMENTS

| 3,031,478 | 4/1962 | Klenk et al. | 260/403 |
| 3,544,605 | 12/1970 | Betzing et al. | 260/403 |
| 4,394,149 | 7/1983 | Szoka, Jr. et al. | 71/27 X |

Primary Examiner—Ferris H. Lander
Attorney, Agent, or Firm—Pearne, Gordon, Sessions, McCoy, Granger & Tilberry

[57] ABSTRACT

New foliage fertilizers containing one or more macronutrients and/or one or more micronutrients as well as 10 to 50% by weight (referred to total nutrients) of one or more phospholipids.

4 Claims, No Drawings

FOLIAGE FERTILIZERS

This is a continuation of application Ser. No. 490,968, filed on May 2, 1983, and now abandoned.

The invention relates to new fertilizers which contain one or more macronutrients and/or one or more micronutrients and phospholipids.

Along with soil fertilizers, recent years have seen foliage fertilizers increasing in importance. It has been shown that plant nutrients can be better utilised and act more quickly if they are not applied to the soil but directly to the plant or its foliage. The conventional foliage fertilizers have however a series of disadvantages which impede their general use. If commercially available foliage fertilizer is used in the quantity necessary for plant nutrition, the leaves can be corroded or burnt, especially in dry, sunny locations of cultivation. To prevent these burns, the amount of nutrient must be reduced, so that fertilization can be insufficient. The fertilization must be repeated several times, which implies labour-intensive operation. Furthermore the nutrients are often eroded from the leaves by wind or rain before they can be absorbed into the plant, so that they do no penetrate to the plant.

Thus the object of the present invention is to develop a new foliage fertilizing system which would guarantee the application of the nutrients to the plant in sufficient quantity, and also guarantee speedy penetration into the plant.

Surprisingly, it has now been found that the effectiveness of conventional foliage fertilizers can be substantially improved if to the latter are added 10–50% (by weight of the total nutrients) of a natural or synthetic phospholipid selected from the group consisting of phosphatidyl choline, the hydrated phosphatidyl cholines, phosphatidyl ethanolamine, the N-acyl-phosphatidyl ethanolamines, phosphatidyl inositol, phosphatidyl serine, lysolecithin and phosphatidyl glycerol.

The new foliage fertilizers according to the invention, on application to the plant, form a thin film which secures the nutrients on the plant and permits speedy penetration into the plant. This leads to improved utilization of the nutrients applied. The nutrients can no longer be rinsed off by wind or rain. Burning or corrosion of the plant is also prevented, since the nutrients are more quickly absorbed by the leaf and metabolized.

The new foliage fertilizers exhibit only a low volatility, so that the nutrients do not crystallise out on the plant or leaves.

Macronutrients or principal nutrients which can be used include nitrogeneous fertilizers, phosphate fertilizers, potassium fertilizers or mixtures thereof. Examples of nitrogenous fertilizers are ammonium sulfate, calcium ammonium nitrate, urea, urea aldehyde condensates, magnesium nitride, ammonium sulfate/nitrate (the mixture), calcium nitrate and calcium cyanamide.

Examples of phosphate fertilizers are superphosphate, double superphosphate, triple superphosphate, ground basic slag, basic (Thomas) steel process phosphate, calcined phosphate, "rhenania phosphate" (phosphate product containing rhenanite), dicalcium phosphate and rock phosphate.

Examples of potassium fertilizers are potassium chloride, potassium sulfate and potassium magnesia.

Further examples of principal nutrients are calcium carbonate, such as limestone or chalk; calcium oxide; magnesium oxide; kieserite and dolomite.

Organic components may also be mixed in: guano, fish meal, bone meal, lignin or peat. Trace elements i.e. micronutrients, include manganese, zinc, iron and copper, e.g. zinc oxides, zinc sulfates, zinc carbonates, copper oxides, molybdenum sulfates and borates.

Phospholipids which can be used include commercially available phosphatidyl cholines or phosphatidyl choline mixtures, e.g.

Phospholipin$^R$ 25
 25% Phosphatidyl choline;
 25% Phosphatidyl ethanolamine:
 20% Phosphatidyl inositol;
Phospholipon$^R$ 38
 38% Phosphatidyl choline;
 16% N-acyl phosphatidyl ethanolamine;
 4% Phosphatidyl ethanolamine;
Phospholipon$^R$ 55
 55% Phosphatidyl choline;
 25% Phosphatidyl ethanolamine;
 2% Phosphatidyl inositol;
Phospholipon$^R$ 80
 80% Phosphatidyl choline;
 10% Phosphatidyl ethanolamine;
Phospholipon$^R$ 100
 96% Phosphatidyl choline;
Phospholipon$^R$ 100H
 96% hydrated Phosphatidyl choline.

Specially preferred are natural phosphatidyl cholines, which can be obtained by means of the processes described in the following patent specifications: DE-PS No. 10 47 599, DE-PS No. 10 53 299, DE-PS No. 16 17 679, DE-PS No. 16 17 680, German patent application Nos. P 30 47 048.5, P 30 47 012.3, and P 30 47 011.2.

Preferred N-acyl-phosphatidyl ethanolamines are those in which the acyl group is derived from saturated or olefinically unsaturated fatty acids with 2-20 carbon atoms, especially the saturated ones with 2-5 carbon atoms or the saturated or olefinically unsaturated ones with 14, 16, 18 or 20 carbon atoms.

The new foliage fertilizers can be obtained by various processes.

The relevant macronutrients and/or micronutrients are mixed with conventional adjuvants and ground with the appropriate amount of phospholipid. The powder or granulate obtained can be emulsified or suspended in water. The relevant macronutrients and/or micronutrients are mixed with conventional adjuvants and sprayed with phospholipids according to conventional procedures e.g. fluidized bed procedures. The product obtained can be emulsified or suspended in water for use. The relevant macronutrients and/or micronutrients are dissolved in water together with conventional adjuvants, with addition of polyols if desired, e.g. glycerine, propylene glycol, ethylene glycol, butylene glycol, or they are slurried and emulsified or suspended according to conventional procedures with addition to phospholipids, which can be dissolved, if desired, in a solvent e.g. lower aliphatic alcohols, such as methanol, ethanol, isopropanol, butanol or isobutanol, or in solvents such as hexane or dioxan.

The resulting emulsions or suspensions can also, if desired, be dried by conventional procedures e.g. spray drying or freeze drying, and re-emulsified or re-suspended as needed.

The new foliage fertilizers can also be produced by dissolving the phospholipids in a solvent e.g. lower aliphatic alcohols such as methanol, ethanol, isopropanol, butanol or isobutanol, or solvents such as hexane or dioxan, in a proportion by weight from 10:1 to 10:5, and stirring the relevant macronutrients and/or micronutrients as well as the conventional adjuvants into the concentrate thus obtained, removing the solvent and grinding the resulting plastic mass. The powder or granulate obtained can be emulsified or suspended in the required amount of water for use. Conventional adjuvants which may be used include chelators, fillers, disintegrators and emulsifiers.

Suitable chelators are substances such as disodium ethylene diamine tetraacetate, sodium hydroxyethylene diamine triacetate, lignosulfonated compounds, polycatechol tanning substances, acetonitrile and ethylene dioxyphenol aminoacetic acid.

Substances such as polyvinyl pyrrolidone and cellulose ether can be worked in as fixatives.

Finally, vegetable oils such as soya oil, sunflower oil and rapeseed oil can be added if desired.

The new foliage fertilizers contain 10–50% by weight of phospholipid, referred to the total nutrient content.

The new foliage fertilizers can be used alone or mixed with conventional plant protective solutions, such as insecticides, herbicides or fungicides, emulsion concentrates or suspension concentrates. They can then be diluted in conventional manner with the necessary amount of water, e.g. with conventional ULV-applicators, and applied equally well from aircraft or from ground-based appliances. They can also be applied by means for artificial rainfall installations. The new foliage fertilizers are particularly adapted for use as diluted sprays, with addition, if desired, of weed killers or pest controllers, in the cultivation of fruit, vegetables, vines, cereals, sugar beet, maize, cotton, tobacco or coffee.

EXAMPLE 1

Preparation of an emulsion concentrate

Cobalt sulfate: 0.05 g
Copper sulfate: 0.015 g
Zinc sulfate: 0.015 g
Borax: 0.015 g
Manganese sulfate: 0.061 g
Magnesium sulfate: 0.408 g
EDTA-Na: 0.750 g
$NH_4HSO_4$: 6.63 g
Urea: 22.45 g are dissolved in 80 ml water and mixed with 40 g glycerine. 30 g phospholipid (dissolved in 30–40 g ethanol) is added to the resulting mixture, and well mixed in. The then resulting mixture, diluted with water, can be applied directly or dried by conventional methods. The resulting granulate can be redispersed as needed.

EXAMPLE 2

Cobalt sulfate: 0.05 g
Copper sulfate: 0.015 g
Zinc sulfate: 0.015 g
Borax: 0.015 g
Manganese sulfate: 0.061 g
Magnesium sulfate: 0.408 g
EDTA-Na: 0.750 g
$NH_4HSO_4$: 6.630 g
Urea: 22.450 g are dissolved in 40 ml water, and 80 g glycerine and 40 g 1,2-propylene glycol are mixed in. To the resulting mixture 30 g phospholipid, dissolved in 30–40 g ethanol, is added and well mixed in.

Similarly to Examples 1 and 2, the following fertilizer concentrated can be prepared:

EXAMPLE 3

Copper sulfate: 0.041 g
Zinc sulfate: 0.023 g
Borax: 0.054 g
Manganese sulfate: 0.105 g
Iron sulfate: 0.051 g
Molybdenum sulfate: 0.004 g
Magnesium oxide: 2 g
Potassium oxide: 10 g
$NH_4HSO_4$: 10 g
Urea: 10 g
Water: 80 ml
Phospholipid: 30 g
Ethanol: 40 g

EXAMPLE 4

Urea: 6.7 g
Ammonium sulfate: 13.3 g
Basic phosphate: 5 g
Potassium oxide: 10 g
Magnesium oxide: 1 g
Iron sulfate: 0.1 g
Borax: 0.05 g
Copper sulfate: 0.02 g
Manganese sulfate: 0.05 g
Zinc sulfate: 0.01 g
Molybdenum sulfate: 0.004 g
Water: 100 ml
Phospholipid: 40 g
Ethanol: 50 g
EDTA-Na: 0.7 g

EXAMPLE 5

Urea: 12.4 g
Dipotassium phosphate: 3.7 g
Water: 60 ml
Phospholipid: 25 g
Ethanol: 40 g

EXAMPLE 6

Urea: 24 g
Dipotassium phosphate: 17 g
Ammonium hydrogen phosphate: 7 g
Iron(II) mono-sodium salt: 11 g
EDTA-Na: 0.8 g
Phospholipid: 40 g
Ethanol: 50 g
Ethylene glycol: 30 g

EXAMPLE 7

Preparation of an emulsion

Urea: 3.2000 g
Ammonium nitrate: 4.3000 g
Di-ammonium hydrogen phosphate: 15.0000 g
Potassium nitrate: 13.0000 g
Borax: 0.0410 g
Iron sulfate: 0.0410 g
Cobalt sulfate: 0.0008 g
Copper sulfate: 0.0164 g
Manganese sulfate: 0.0353 g
Ammonium molybdate: 0.0014 g
Zinc sulfate: 0.0120 g
EDTA-Na: 0.5000 g
Water: 98.3521 g Phospholipid: 10.0000 g
Alcohol: 3.0000 g
Emulsifier (Glycerine-polyethylene glycol ricinoleate): 2.5000 g The salts, dissolved in water, are well mixed with the phospholipid-alcohol solution and the emulsifier.

EXAMPLE 8

Preparation of a suspension

Urea: 9.7000 g
Ammonium nitrate: 16.6000 g
Potassium nitrate: 32.0000 g
magnesium oxide: 3.0000 g
Calcium oxide: 10.0000 g
Borax: 0.1330 g
Iron sulfate: 0.0710 g
Cobalt sulfate: 0.0007 g
Copper sulfate: 0.0500 g
Manganese sulfate: 0.1820 g
Ammonium molybdate: 0.0020 g
Zinc sulfate: 0.0330 g
EDTA-Na: 0.5000 g
Water: 65.2283 g
Phospholipid: 10.0000 g
Emulsifiers (mixture of hydrated castor oil, ethoxylated, plus glycerine polyethylene glycol ricinoleate): 2.5000 g These substances are put together, ground for about 10-60 minutes at 20°-50° C. in a mill and then suspended in water.

EXAMPLE 9

Preparation of a granulate

Urea: 11.8000 g
Ammonium nitrate: 15.7000 g
Di-ammonium hydrogen phosphate: 9.3000 g
Potassium nitrate: 15.2260 g
Borax: 0.1500 g
Iron sulfate: 0.0500 g
Cobalt sulfate: 0.0080 g
Copper sulfate: 0.0400 g
Manganese sulfate: 0.2000 g
Ammonium molybdate: 0.0010 g
Zinc sulfate: 0.0250 g
EDTA-Na: 0.5000 g
Phospholipid: 20.0000 g
Emulsifier: 5.0000 g
Bentonite: 10.0000 g
Lignin sulfonate: 5.0000 g
Polyvinyl pyrrolidone: 7.0000 g These substances are well mixed and granulated in conventional manner. The resulting granulate is redispersed in water before application.

What we claim is:

1. A process for the preparation of phospholipid containing foliage fertilizers comprising one or several macronutrients and 10 to 50% by weight (based on the total weight of the nutrients) of one or several phospholipids consisting of the steps of:
    (1) dissolving said one or several phospholipids in a solvent by stirring the phospholipids and solvent until a first solution is formed;
    (2) dissolving said one or several macronutrients together with any conventional adjuvants in a solvent in the presence of a polyol by stirring the macronutrients, any adjuvants, solvent and polyol until a second solution is formed; and
    (3) combining and stirring said first and second solutions with water to provide upon the blending thereof an aqueous emulsion or suspension useful as a foliage fertilizer.

2. A process as set forth in claim 1, wherein the solvent in step (2) is water and the polyol is one or more members selected from the group consisting of glycerine, propylene glycol, ethylene glycol and butylene glycol.

3. A process as set forth in claim 1, wherein the solvent in step (1) is selected from the group consisting of methanol, ethanol, isopropanol, butanol, isobutanol, hexane or dioxane.

4. A process for the preparation of phospholipid containing foliage fertilizers comprising one or several macronutrients and 10 to 50% by weight (based on the total weight of the nutrient) of one or several phospholipids consisting of the steps of:
    (1) dissolving said one or several phospholipids in a solvent by stirring the phospholipids and solvent until a first solution is formed;
    (2) dissolving said one or several macronutrients together with any conventional adjuvants in said first solution by stirring the macronutrients, any adjuvants and first solution until a second solution is formed; and
    (3) removing the solvent and grinding the resultant plastic mass to provide a powder or granulate which can be combined and stirred with water to provide upon the blending thereof an aqueous emulsion or suspension useful as a foliage fertilizer.

* * * * *